(12) United States Patent
Nakatani et al.

(10) Patent No.: US 7,544,904 B2
(45) Date of Patent: Jun. 9, 2009

(54) ELECTRONIC APPARATUS

(75) Inventors: Masato Nakatani, Kawaguchi (JP);
Yasuyuki Suzuki, Tachikawa (JP);
Yosuke Miura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 120 days.

(21) Appl. No.: 11/544,798

(22) Filed: Oct. 5, 2006

(65) Prior Publication Data

US 2007/0144885 A1 Jun. 28, 2007

(30) Foreign Application Priority Data

Dec. 22, 2005 (JP) ............................. 2005-370845

(51) Int. Cl.
*H01H 9/00* (2006.01)
(52) U.S. Cl. .................. 200/5 A; 200/520; 345/168
(58) Field of Classification Search ................ 200/5 A, 200/512–520, 293, 295, 341–345; 341/22, 341/33, 34; 345/173, 168
See application file for complete search history.

(56) References Cited

U.S. PATENT DOCUMENTS

| 5,569,889 | A | * | 10/1996 | Bruner | 200/5 A |
| 6,219,038 | B1 | * | 4/2001 | Cho | 200/305 |
| 6,281,887 | B1 | * | 8/2001 | Wang | 345/173 |
| 7,075,785 | B2 | * | 7/2006 | Minaguchi et al. | 361/683 |
| 7,085,130 | B2 | * | 8/2006 | Lin et al. | 200/344 |
| 7,119,291 | B2 | * | 10/2006 | Sun | 200/5 A |
| 2006/0201792 | A1 | * | 9/2006 | Sun | 200/5 |

FOREIGN PATENT DOCUMENTS

| JP | 64-13638 | 1/1989 |
| JP | 1-66728 | 4/1989 |
| JP | 06-318421 | 11/1994 |
| JP | 11-134968 | 5/1999 |
| JP | 2000-251575 | 9/2000 |
| JP | 2001-222931 | 8/2001 |
| JP | 2003-037663 | 2/2003 |
| JP | 2003-162940 | 6/2003 |
| JP | 2003162940 | 6/2003 |
| JP | 2004-259537 | 9/2004 |

OTHER PUBLICATIONS

Japanese Office Action dated Apr. 22, 2008 for application No. 2005-370845 (U.S. Appl. No. 11/544,798), entitled Information Electronic Apparatus (English Translation).
Japanese Office Action (English translation), mailed Aug. 26, 2008, Japanese Patent Application 2005-370845.
Japanese Office Action (English translation), mailed Nov. 18, 2008, Japanese Patent Application 2005-370845.

* cited by examiner

*Primary Examiner*—Elvin G Enad
*Assistant Examiner*—Marina Fishman
(74) *Attorney, Agent, or Firm*—Blakely, Sokoloff, Taylor & Zafman LLP (57) ABSTRACT

According to one embodiment, an electronic apparatus includes a housing and a button. The housing contains a switch. The button is arranged in the housing, opposed to the switch and configured to operate the switch. The switch is positioned off a center of the button.

10 Claims, 7 Drawing Sheets

ELECTRONIC APPARATUS

CROSS-REFERENCE TO RELATED APPLICATIONS

This application is based upon and claims the benefit of priority from Japanese Patent Application No. 2005-370845, filed Dec. 22, 2005, the entire contents of which are incorporated herein by reference.

BACKGROUND

1. Field

One embodiment of the invention relates to an electronic apparatus, for example, such as an electronic apparatus, which includes a button opposed to a switch.

2. Description of the Related Art

Electronic apparatuses such as portable computers are provided with push buttons including a power switch button and a click button. The push buttons are arranged in openings of an outer wall of the housing and can be depressed with the fingertips or the like.

An electronic apparatus that has push buttons arranged in a small space is disclosed in, for example, Jpn. Appln. KOKAI Publication No. 2004-259537. This electronic apparatus has a housing, push buttons and click switches. The housing has a wall having an opening. Each push button has a button body and two arms. The arm has one end supported on the rim of the opening. The arm supports, at the other end, the button body, allowing the same to move. The button body and the arms overlap each other, reducing the space in which the push buttons are arranged.

The click switches are arranged, each below the associated button body. Each click switch operates upon when it touches the lower surface of the button body as the user pushes the button body.

The user does not always push the center part of a button body. He or she may often push an edge part of the button body, which lies remote from the center of the button body. Remote from that portion of the button body that is coupled to the arm, the edge part of the button body acts like the distal end of a so-called cantilever. Therefore, the edge part is moved down more than any other part of the button body. The center part of the button body is moved down, too, but little.

The center part of the button body may not be moved down much enough to contact the click switch when the user pushes the edge part of the button body. In other words, each click switch may not operate when the user pushes the circumferential edge of the button body.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus includes a housing and a button. The housing contains a switch. The button is arranged in the housing, opposed to the switch and configured to operate the switch. The switch is positioned off a center of the button.

Embodiments of the present invention applied to a portable computer will now be described with reference to the accompanying drawings.

Figure 1:
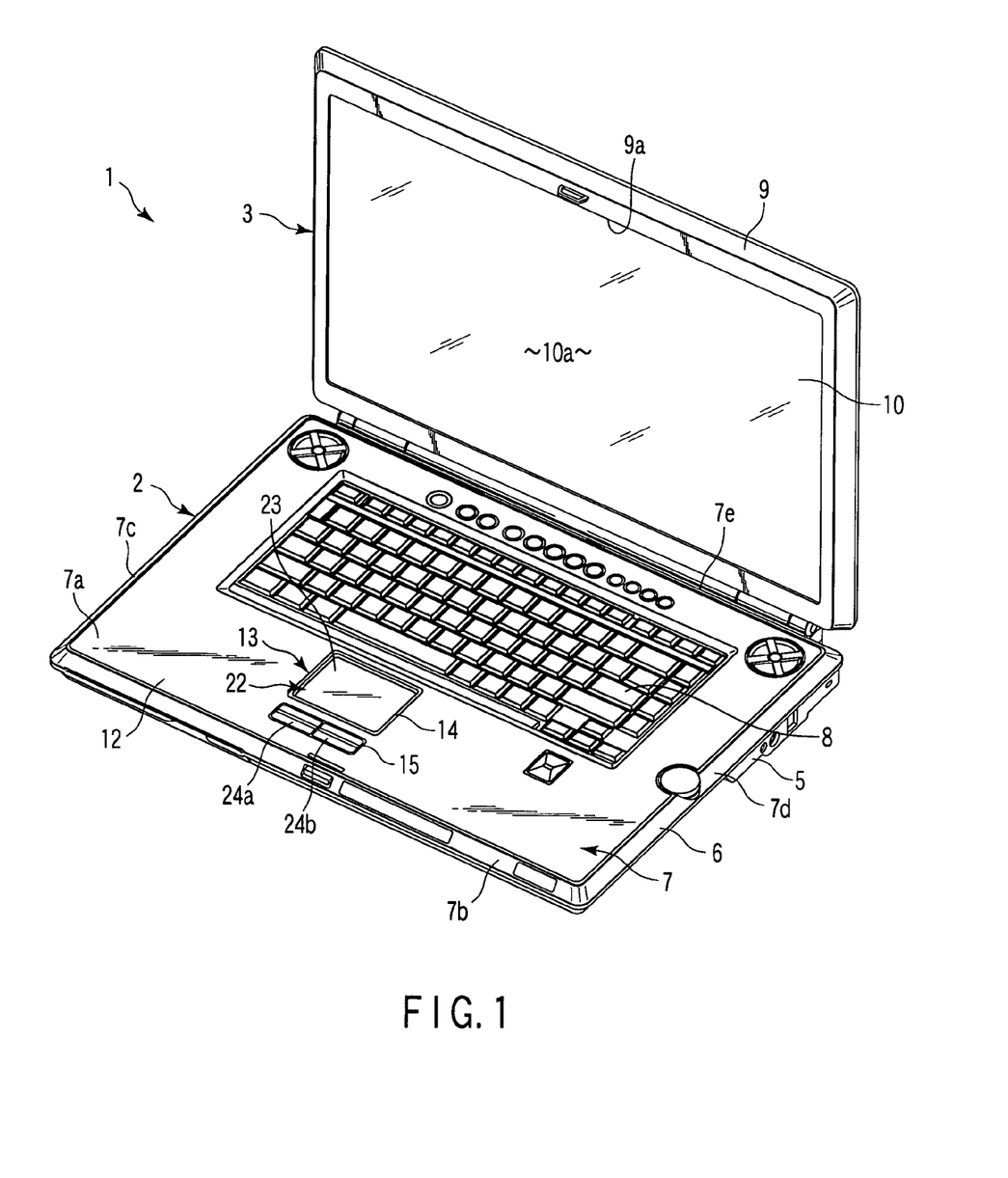
FIG. 1 is an exemplary perspective view of a portable computer according to a first embodiment of this invention.

FIGS. 1 to 8 show a potable computer 1, as an electronic apparatus according to the first embodiment of this invention. FIG. 1 shows the portable computer 1. The portable computer 1 includes a main unit 2 and a display unit 3.

As shown in FIG. 1, the main unit 2 includes a base 5 and a cover 6. The cover 6 is secured to the base 5 from above. The base 5 and the cover 6 constitute a box-shaped housing 7. Thus, the main unit 2 includes this housing 7. The housing 7 includes a top wall 7a, a front wall 7b, a left wall 7c, a right wall 7d, a rear wall 7e, and a bottom wall (not shown). The top wall 7a supports a keyboard 8. The top wall 7a is an example of an outer wall.

As FIG. 1 shows, the display unit 3 includes a display housing 9 and a liquid crystal display panel 10 which is contained in the display housing 9. The display housing 9 includes an opening 9a in the front. The liquid display panel 10 includes a display screen 10a. The display screen 10a is exposed outside the display housing 9 through the opening 9a.

A hinge device couples the display unit 3 to the rear edge of the housing 7. The display unit 3 can rotated between a closed position and an opened position. At the closed position, the display unit 3 lies, covering the top wall 7a from above. At the opened position, the display unit 3 stands, exposing the top wall 7a.

As FIG. 1 shows, the top wall 7a includes a palm rest 12. The palm rest 12 lies in front of the keyboard 8 and extends in the widthwise direction of the housing 7. The top wall 7a includes a touch-pad holder section 13, which is located in front of the keyboard 8 and half way between the left wall 7c and the right wall 7d.

Figure 3:
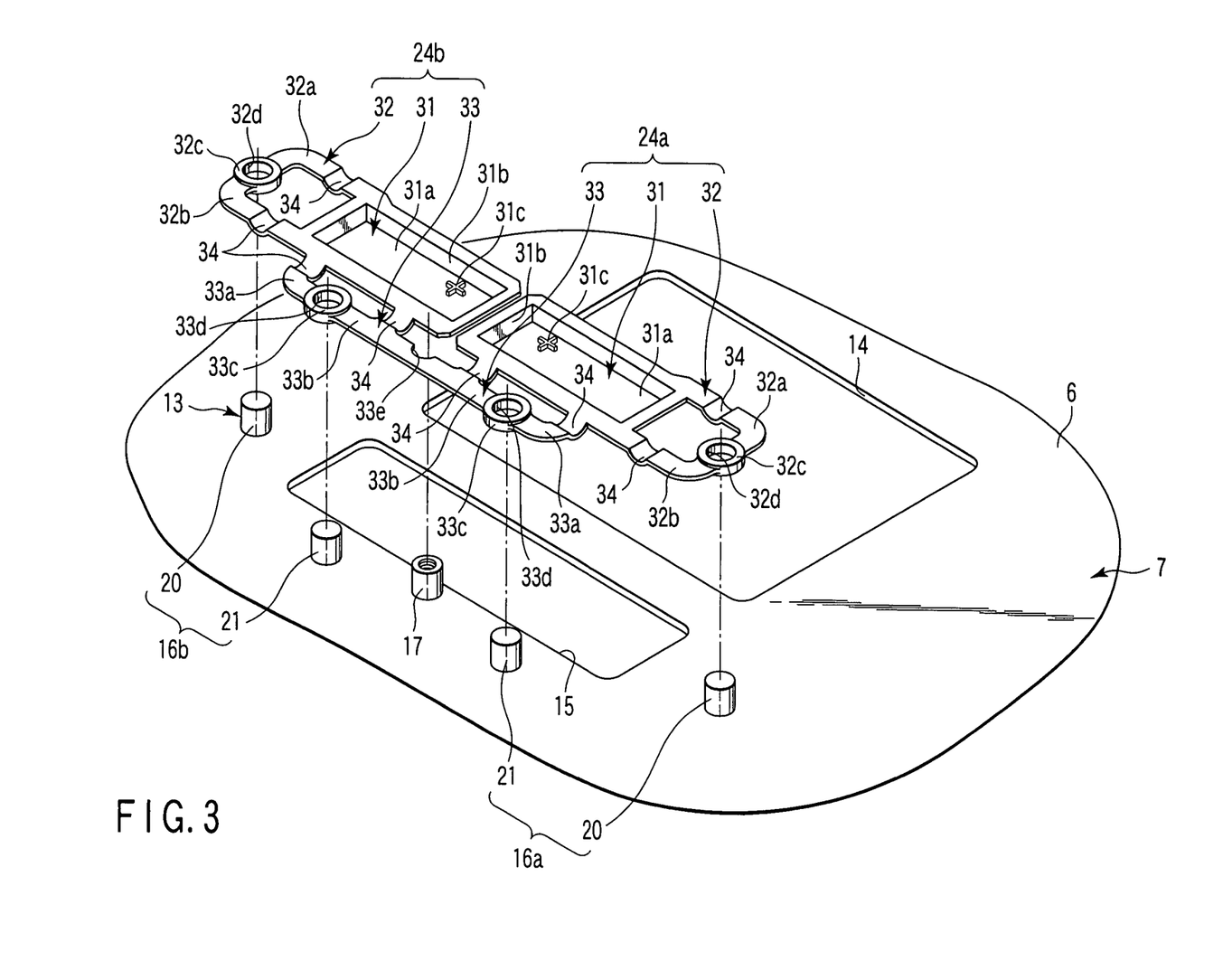
FIG. 3 is an exemplary exploded view showing the touch-pad buttons used in the first embodiment, which have been removed from the housing of the portable computer.

FIG. 3 shows the cover 6 turned upside down and illustrates the interior of the housing 7. As shown in FIGS. 1 and 3, the cover includes a first opening 14 and a second opening 15. As shown in FIG. 3, the touch-pad holder section 13 includes a left button mounting section 16a, a right button mounting section 16b, and a position-adjusting boss 17. The first and second openings 14 and 15 are made in the top wall 7a and open to the outside the housing 7.

Figure 2:
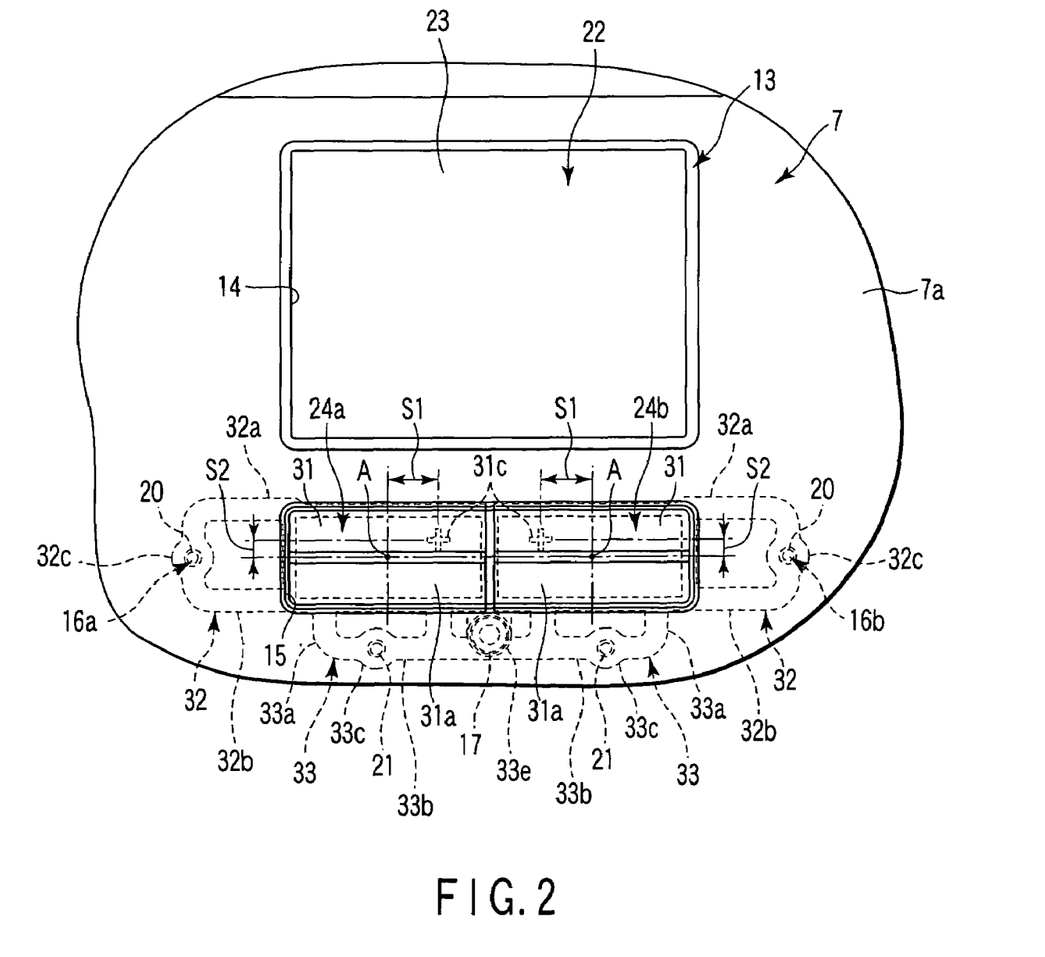
FIG. 2 is an exemplary plan view of the portable computer according to the first embodiment.

As seen from FIGS. 2 and 3, the left button mounting section 16a includes a first support projection 20 and a second support projection 21. Similarly, the right button mounting section 16b includes a first support projection 20 and a second support projection 21. Each of the support projections 20 is an example of an arm-support, and each of the support projections 21 is an example of another arm-support.

The first support projections 20 and the second support projections 21 are provided in the housing 7. The projections 20 and 21 protrude inwards from the inner surface of the top wall 7a. They are made of, for example, resin, and are integrally formed with the housing 7.

As FIG. 2 depicts, the first support projection 20 of the left button mounting section 16a is located on the left side of the second opening 15. The second support projection 21 of the left button mounting section 16a is located in front of the second opening 15. The first support projection 20 of the right button mounting section 16b is located on the right side of the second opening 15. The second support projection 21 of the right button mounting section 16b is located in front of the second opening 15. That is, each of the second support projections 21 of the left and right button mounting sections 16a, 16b is arranged in a direction crossing, for example at right angles to, the direction in which the first support projection 20 is spaced from the second opening 15.

The position-adjusting boss 17 lies between the second support projection 21 of the left button mounting section 16a and the second support projection 21 of the right button mounting section 16b. The boss 17 protrudes in the housing 7 from the inner surface of the top wall 7a.

Figure 4:
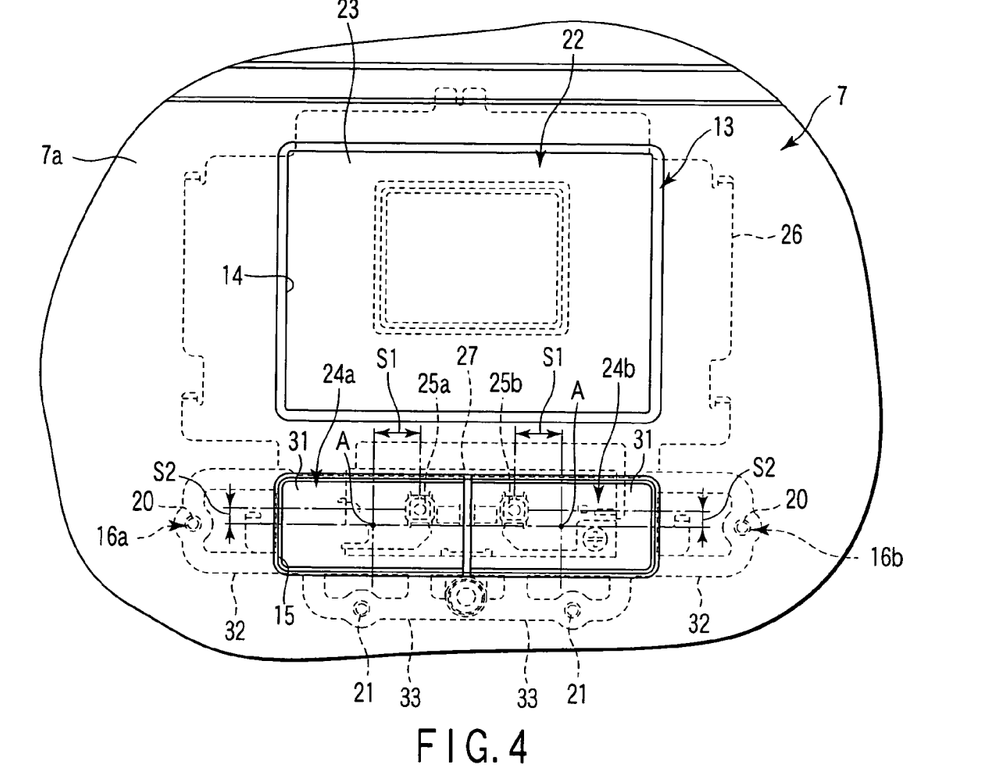
FIG. 4 is an exemplary plan view of the touch-pad unit used in the first embodiment.

As FIG. 4 shows, the housing 7 contains a touch-pad unit 22, which is held by the touch-pad holder section 13. The touch-pad unit 22 includes a touch-pad body 23, a left tough-pad button 24a, a right touch-pad button 24b, a left click switch 25a, a right click switch 25b, a first circuit board 26, and a second circuit board 27.

The touch-pad body 23 is a pointing device that is operated to move the cursor displayed on, for example, the screen 10a of the display unit 3. As seen from FIG. 4, the touch-pad body 23 is arranged below, and aligned with, the first opening 14 of the top wall 7a. Thus, the touch-pad body 23 is therefore exposed outside the housing 7, through the first opening 14. The user can therefore operate the touch-pad body 23 from outside the housing 7.

Each of the left touch-pad button 24a and the right touch-pad button 24b is an example of push button. The left touch-pad button 24a (hereinafter referred to as left button 24a) is pushed to operate the left click switch 25a (hereinafter referred to as left switch 25a). The right touch-pad button 24b (hereinafter referred to as right button 24b) is pushed to operate the right click switch 25b (hereinafter referred to as right switch 25b). Note that the left and right switches 25a and 25b are operated to, for example, execute and cancel commands.

As FIGS. 2 and 3 show, the left and right buttons 24a and 24b include a button body 31, a first arm 32 and a second arm 33 each. The button body 31 and the first and second arms 32 and 33 are integrally formed, made of, for example, resin material, and are elastic.

Figure 5:
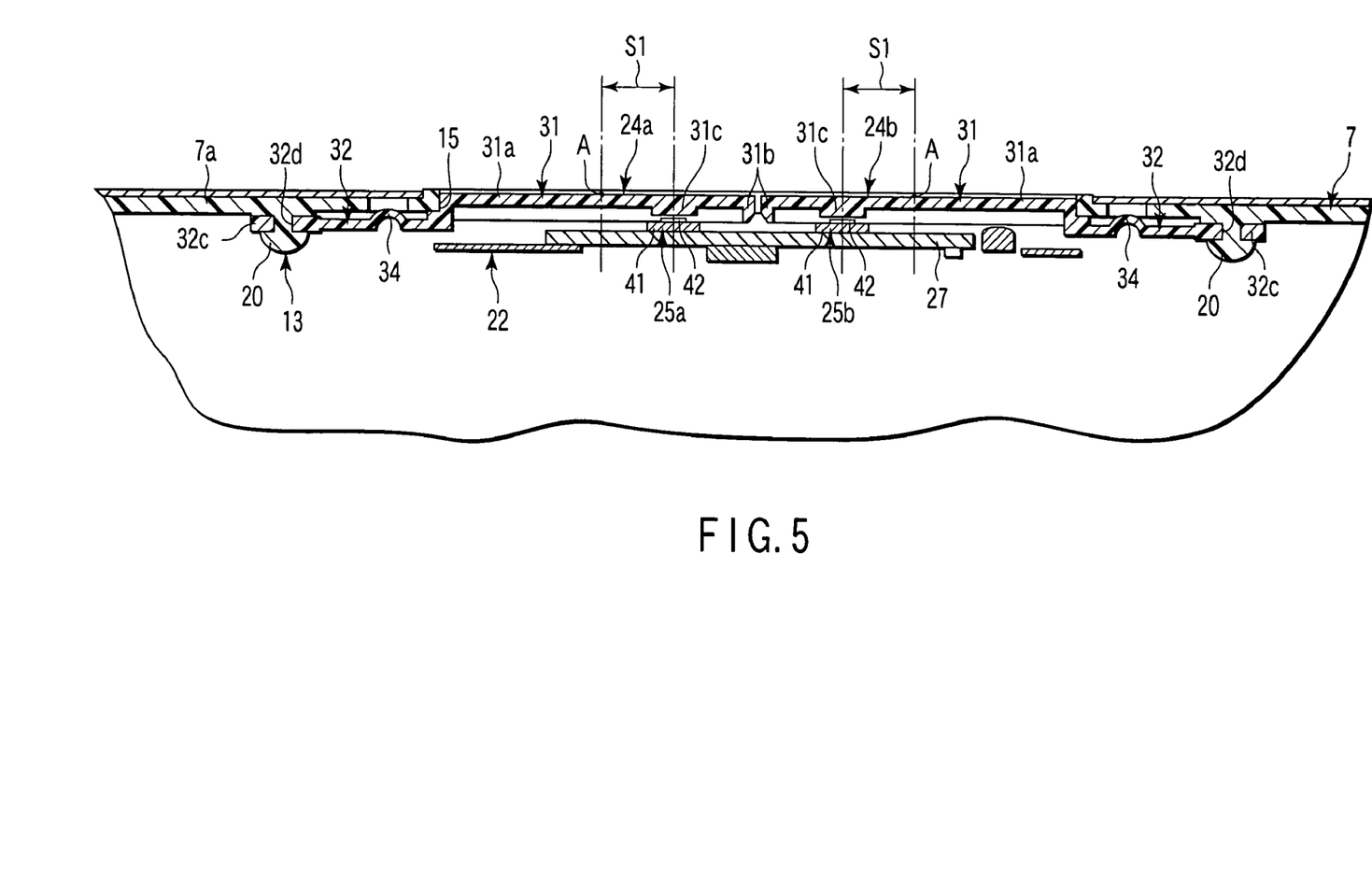
FIG. 5 is an exemplary sectional view of the portable computer according to the first embodiment.

As shown in FIG. 5, each button body 31 includes a top wall 31a and sidewall 31b that extends inwardly from the edge of the top wall 31a. Thus, the button body 31 includes a recess that opens to the interior of the housing 7. The button bodies 31 of the left and right buttons 24a and 24b are inserted in the second opening 15, with their edges extending along an inner peripheral surface of the second opening 15. The top wall 31a of each button body 31 is therefore exposed outside the housing 7 through the second opening 15.

As is illustrated in FIG. 3, a pushing projection 31c is provided on the inner surface of the top wall 31a of each button body 31. The pushing projection 31c is shaped like a cross and protrudes inwardly in the housing 7. As shown in FIG. 2, the pushing projection 31c of the left button 24a shifts distance s1 toward the right wall 7d from the center A of the button body 31 in the widthwise direction of the housing 7, and shifts distance s2 toward the rear wall 7e from the center A in the depth direction of the housing 7.

The pushing projection 31c of the right button 24b shifts distance s1 toward the left wall 7c from the center A in the widthwise direction of the housing 7, and shifts distance s2 toward the rear wall 7e from the center A in the depth direction of the housing 7.

The first arms 32 and the second arms 33 will be described. The arms 32 and 33 are examples of support parts that are supported by the housing 7. Only the first and second arms 32 and 33 of the left button 24a will be described here. Note that the first and second arms 32 and 33 of the right button 24b differ from those of the left button 24a, only in that they are laterally inverted in position. Note that the components of the right button 24b are designated at the same reference numbers as those of the left button 24a.

As shown in FIGS. 2 and 3, the first arm 32 includes a first member 32a and a second member 32b. The first member 32a of the left button 24a extends from the left-rear part of the button body 31 toward the left wall 7c. The distal part of the first member 32a is bent toward the front wall 7b. The second member 32b of the left button 24a extends from the left-front part of the button body 31 toward the left wall 7c. The distal part of the second member 32b is bent toward the rear wall 7e.

The first member 32a and the second member 32b are coupled at their distal ends. The junction between the first and second members 32a and 32b is a first fastening part 32c. The first fastening part 32c is a little thicker than the first and second members 32a and 32b and includes a first through hole 32d in its center part.

The second arm 33 includes a third member 33a and a fourth member 33b. The third member 33a of the left button 24a extends from the front-left part of the button body 31 toward the front wall 7b. The distal part of the third member 33a is bent toward the right wall 7d. The fourth member 33b of the left button 24a extends from the front-right part of the button body 31 toward the front wall 7b. The distal part of the fourth member 33b is bent toward the left wall 7c. Thus, the second arm 33 extends in a line which crosses a line that extends from the center of the left button 24a toward the first arm 32.

The third member 33a and the fourth member 33b are coupled at their distal ends. The junction between the third and fourth members 32a and 32b is a second fastening part 33c. The second fastening part 33c is a little thicker than the third and fourth members 33a and 33b and includes a second through hole 33d in its center part.

The fourth member 33b of the left button 24a and the fourth member 33b of the right button 24b are coupled to each other, forming an integral component. The junction between the left and right buttons 24a and 24b includes a U-notch 33e. The rim of this notch 33e curves along the circumference of the position-adjusting boss 17 mentioned above.

As illustrated in FIG. 3, the first and second support projections 20 and 21 are inserted in the first and second through holes 32d and 33d, respectively. As a result, the left and right buttons 24a and 24b are secured to the left and right button mounting sections 16a and 16b, respectively. At this time, the junction of the left and right buttons 24a and 24b abuts on the position-adjusting boss 17, with the boss 17 fitted in the notch 33e. The left and right buttons 24a and 24b are therefore adjusted in position.

After the first and second support projections 20 and 21 are inserted into the first and second through holes 32d and 33d, they are fused to the first and second fastening parts 32c and 33c, respectively. The first arm 32 is thereby secured at one end portion to the first support projection 20. Thus, the first arm 32 is supported by the housing 7. Further, the second arm 33 is secured at one end portion to the second support projection 21, and the second arm 33 is therefore supported by the housing 7.

As illustrated in FIGS. 2 and 5, the button body 31 is supported by the first and second arms 32 and 33 and held by the housing 7. Since the button body 31 and the arms 32 and 33 have elasticity, the button body 31 can move between a position where it is spaced from the switches 25a and 25b and another position where it contacts the switches 25a and 25b. When pushed by the user, the button body 31 moves, contacting the switches 25a and 25b. The switches 25a and 25b are thereby operated.

The first to fourth members 32a, 32b, 33a and 33b include a curved part 34. The curved part 34 is bent in the direction of height of the housing 7. Since the members 32a, 32b, 33a and 33b include a curved part 34, the first and second arms 32 and 33 are more elastic than otherwise.

The housing 7 contains the left and right switches 25a and 25b. The left and right switches 25a and 25b are arranged below, and aligned with, the left and right buttons 24a and 24b, respectively. In other words, the left and right buttons 24a and 24b are provided in the housing 7 and opposed to the switches 25a and 25b to operate them.

The left and right switches 25a and 25b are of a contact type and include a switch body 41 and a switch top 42. The switch top 42 can move with respect to the switch body 41. Each of the left and right switches 25a and 25b is operated when the switch top 42 moves toward the switch body 41.

As shown in FIG. 4, the left switch 25a lies below, and is aligned with, the pushing projection 31c of the left button 24a. That is, the left switch 25a is positioned off the center A of the button body 31 by distance s1 toward the right wall 7d in the widthwise direction of the housing 7, and positioned off the center A by distance s2 toward the rear wall 7e in the direction of depth of the housing 7.

In other words, the left switch 25a is arranged farther from the first support projection 20 of the left button mounting section 16a than from the center A of the button body 31, and also farther from the second support projection 21 than the center A of the button body 31. Put another way, the left switch 25a faces that part of the button body 31 which moves down more than the center A as the user depresses the left button 24a. The left switch 25a is positioned off the center A of the left button 24a not only in a direction which separates from the first arm 32, but also in a direction which separates from the second arm 33.

The right switch 25b lies below, and is aligned with, the pushing projection 31c of the right button 24b. That is, the right switch 25b is positioned off the center A of the button body 31 by distance s1 toward the left wall 7c in the widthwise direction of the housing 7, and positioned off the center A by distance s2 toward the rear wall 7e in the direction of depth of the housing 7.

In other words, the right switch 25b is arranged farther from the first support projection 20 of the right button mounting section 16b than from the center A of the button body 31, and also farther from the second support projection 21 than the center A of the button body 31. Put another way, the right switch 25b faces that part of the button body 31 which moves down more than the center A as the user depresses the right button 24b. The right switch 25b is positioned off the center A of the right button 24b not only in a direction which separates from the first arm 32, but also in a direction which separates from the second arm 33.

In the present embodiment, the left and right switches 25a and 25b lie, each at the midpoint between the rear edge of the second opening 15 and a line passing through the center A of the second opening 15 and extending in the widthwise direction of the housing 7. The left and right switches 25a and 25b lie, for example, each at the midpoint between the edge of the button body 31 and the center A thereof.

The left and right switches 25a and 25b are mounted on the first circuit board 26. The first circuit board 26 is electrically connected to the second circuit board 27 and is electrically connected to a main circuit board (not shown).

How the portable computer 1 operates will be explained, with reference to FIGS. 6 to 8.

Figure 6:
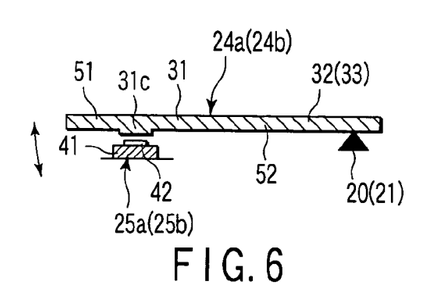
FIG. 6 is an exemplary sectional view schematically depicting one of the button switches used in the first embodiment.

FIG. 6 schematically shows the positional relation between the left button 24a, the left switch 25a and the first support projection 20. Note that the left button 24a, the left switch 25a and the second support projection 21 have a similar positional relation. Further, the right button 24b, the right switch 25b and the first support projection 20 have a similar positional relation. Still further, the right button 24b, the right switch 25b and the second support projection 21 have a similar relation.

The button 24a is a kind of cantilever that is held at one end portion by the support projection 20. It can move toward and away from the switch 25a.

Figure 7:
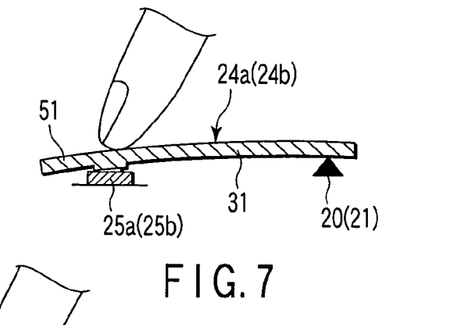
FIG. 7 is an exemplary sectional view showing a button switch pushed at an edge part of the button body in the first embodiment.

FIG. 7 shows the button 24a that the user pushes at an edge part 51 of button body 31 that is not coupled to the arm 32. When the user pushes the button 24a, the button 24a moves toward the switch 25a because of its elasticity. When the pushing projection 31c of the button body 31 contacts the switch top 42 of the switch 25a, the switch body 41 generates a signal indicating that the button 24b has been pushed.

Figure 8:
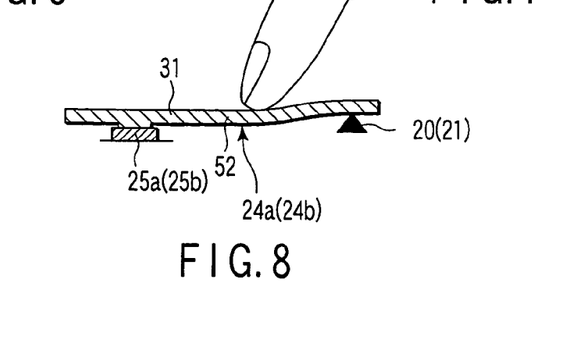
FIG. 8 is an exemplary sectional view showing a button switch pushed at the center part of the button body in the first embodiment.

FIG. 8 shows the button 24a that the user pushes at the center part 52 of button body 31. When the user pushes its center part, the button 24a moves toward the switch 25a, in the same manner as when the user pushes an edge part 51 of the button body 31. When the pushing projection 31c of the button body 31 contacts the switch top 42 of the switch 25a, the switch body 41 generates a signal indicating that the button 24b has been pushed.

On the portable computer 1 of the configuration described above, the switches 25a and 25b can be easily turned on even if the user pushes the button body 31 at any edge part. This increases the operability of the buttons 24a and 24b.

Figure 11:
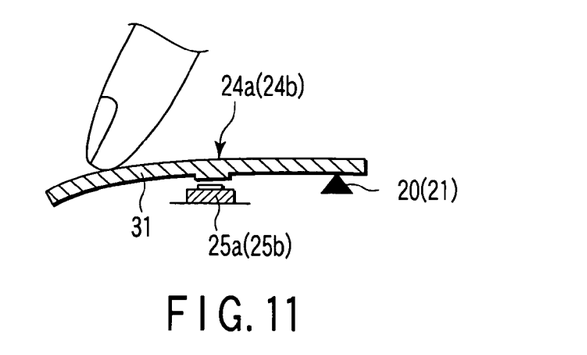
FIG. 11 is an exemplary sectional view of a switch that lies at the center of the button body.

FIG. 11 schematically depicts a switch 25a that aligned with the center of the button body 31 and that is pushed at an edge part which is not coupled to the arm 32. This edge part is the distal end of a cantilever. It can therefore move down more readily than the center part of the button body 31.

If the user pushes an edge part of the button body 31, the center part of the button body 31 does not move so much to contact the switch 25a. In this case, the switch 25 is not operated as desired. In other words, the switch 25a is not operated unless an edge part is pushed by a longer stroke than the center part.

In the present embodiment, the switch 25a is positioned, by design, off the center A of the button body 31. Namely, the switch 25a is spaced from the support projection 20 (i.e., fulcrum), with respect to the center A of the button body 31.

Therefore, the switch 25a is operated even if the user depresses the edge part 51 of the button body 31 as shown in FIG. 7, provided that the button body 31 moves a distance as long as the distance between the button body 31 and the switch 25a.

Even if the user pushes the center part 52 of the button body 31 as shown in FIG. 8, the switch 25 is operated if the button body 31 moves a distance between it and the switch 25a. Note that the switch 25a acts as a fulcrum that supports the button 24a. The button 24a is therefore a so-called dual beam, supported at both ends by the support projection 20 and the switch 25a. Since the button 24 is supported at both ends, it will not greatly bend when the center part 52 of the button body 31 is pushed, even if the switch 25a does not lie beneath the center part 52 of the button body 31. Hence, the switch 25a can be reliably operated, whichever part of the button body 41 is pushed.

Since the switch 25a is positioned, by design, off the center A of the button body 31, the switch 25a can be more reliably operated than otherwise, no matter which part of the button body 31 is pushed. In other words, the switch 25a is operated if the button body 31 is depressed by relatively short stroke, whichever part of the body 31 is depressed.

The portable computer 1 according to this embodiment includes another arm (i.e., second arm 33) and another arm support (i.e., second support projection 21). The button body 31 is supported not only in one direction by the first arm 32, but also in a different direction by the second arm 33. Thus, the button body 31 is held stably.

The switches 25a and 25b are positioned off the center A of the button body 31 in the opposite directions, toward the first and second support projections 20 and 21, respectively. In the portable computer 1 according to this embodiment, the second support projection 21 and the second arm 33 are provided and the switches 25a and 25b are deviated from the second support projection 21, too. Therefore, both switches 25a and 25b are reliably operated even if the user pushes a front edge part or rear edge part of the button body 31. This enhances the operability of the switches 25a and 25b.

The switches 25a and 25b are reliably operated even if the button body 31 is pushed at any edge part, particularly because the second support projection 21 is provided in a line extending at right angles to a line that connects the first support projection 20 and the center A of the button body 31.

The switches 25a and 25b are positioned off the centers A of the button bodies 31, each almost at the midpoint between the rear edge of the second opening 15 and the center A of the button body 31. This also helps to enhance the operability of both buttons 24a and 25b.

Figure 9:
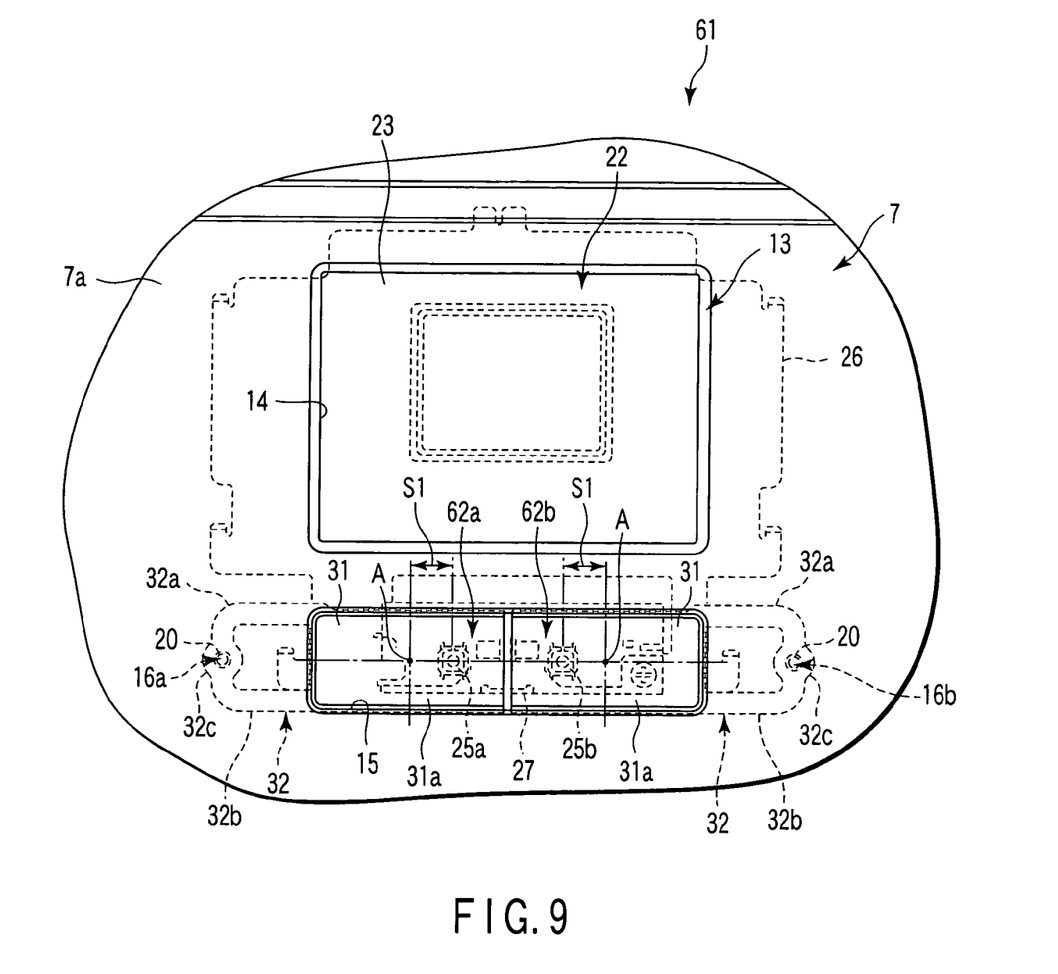
FIG. 9 is an exemplary plan view of a portable computer according to a second embodiment of this invention.

A portable computer 61 according to a second embodiment of this invention will be described, with reference to FIG. 9. The components identical in function to those of the portable computer 1 according to the first embodiment are designated at the same reference numbers and will not described. As FIG. 9 shows, two first arms 32 support the left and right buttons 62a and 62b, respectively.

The pushing projection 31c of the left button 62a shifts from the center A of the button body 31, by distance s1 toward the right wall 7d in the widthwise direction of the housing 7. The pushing projection 31c of the right button 62b shifts from the center A of the button body 31, by distance s1 toward the left wall 7c in the widthwise direction of the housing 7.

The left switch 25a is positioned off the center A of the button body 31 by distance s1 toward the right wall 7d in the widthwise direction of the housing 7. In other words, the left switch 25a is arranged farther from the first support projection 20 of the left button mounting section 16a than from the center A of the button body 31.

The right switch 25b is positioned off the center A of the button body 31 by distance s1 toward the left wall 7c in the widthwise direction of the housing 7. In other words, the right switch 25b is arranged farther from the first support projection 20 of the right button mounting section 16b than from the center A of the button body 31.

On the portable computer 61 thus configured, the switches 25a and 25b can be reliably operated even if the user pushes an edge part of the button body 31. The operability of the buttons 62a and 62b therefore increases. That is, the switches 25a and 25b can be operated even if the button body 31 is depressed by relatively short stroke, at any edge part deviating from the center A in the widthwise direction of the housing 7.

Figure 10:
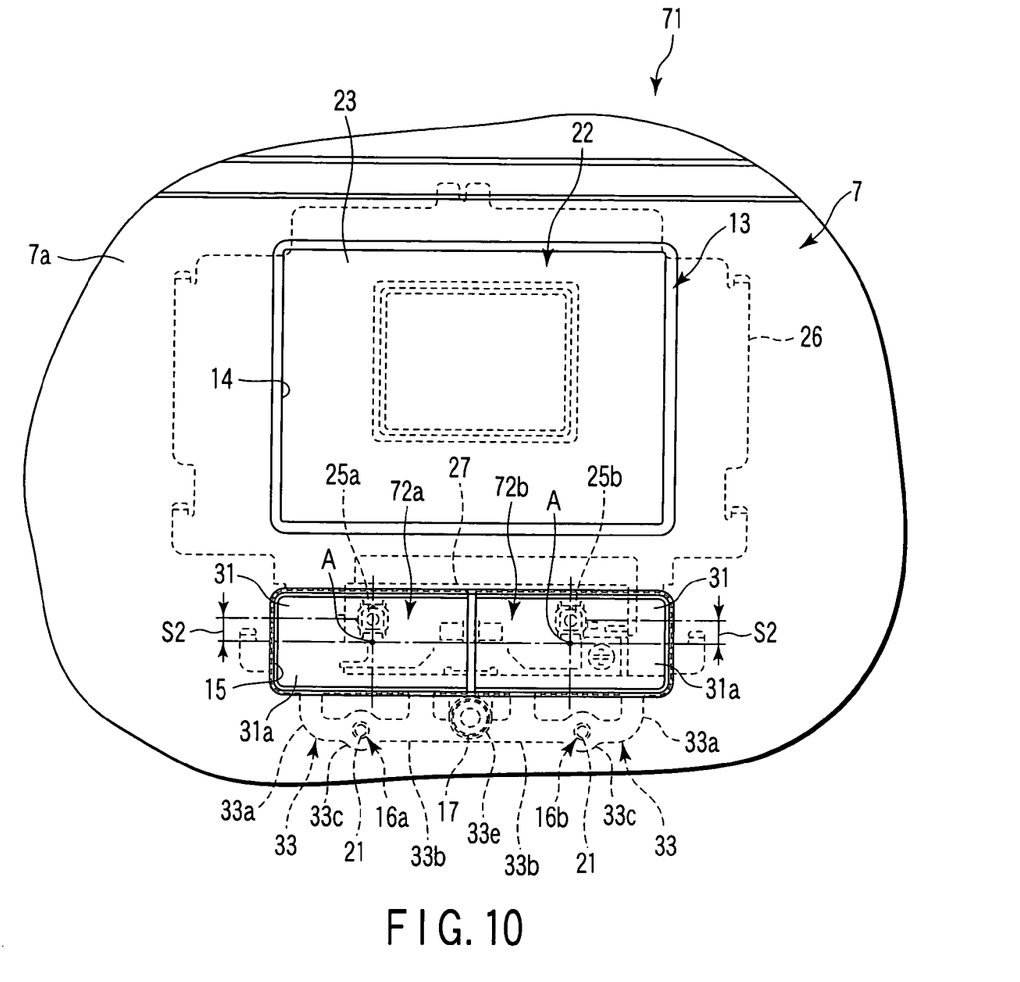
FIG. 10 is an exemplary plan view of a portable computer according to a third embodiment of this invention.

A portable computer 71 according to a third embodiment of this invention will be described, with reference to FIG. 10. The components identical in function to those of the portable computer 1 according to the first embodiment are designated at the same reference numbers and will not described. As FIG. 10 shows, two second arms 33 support the left and right buttons 72a and 72b, respectively.

The pushing projection 31c of the left button 72a shifts from the center A of the button body 31, by distance s2 toward the rear wall 7e in the direction of depth of the housing 7. The pushing projection 31c of the right button 72b shifts from the center A of the button body 31, by distance s2 toward the rear wall 7e in the direction of depth of the housing 7.

The left switch 25a is positioned off the center A of the button body 31 by distance s2 toward the rear wall 7e in the direction of depth of the housing 7. In other words, the left switch 25a is arranged farther from the second support projection 21 of the left button mounting section 16a than from the center A of the button body 31.

The right switch 25b is positioned off the center A of the button body 31 by distance s2 toward the rear wall 7e in the direction of depth of the housing 7. In other words, the right switch 25b is arranged farther from the second support projection 21 of the right button mounting section 16b than from the center A of the button body 31.

Also, on the portable computer 71 thus configured, the switches 25a and 25b can be reliably operated even if the user pushes an edge part of the button body 31. The operability of the buttons 72a and 72b therefore increases. That is, the switches 25a and 25b can be operated even if the button body 31 is depressed by relatively short stroke, at any edge part deviating from the center A in the direction of depth of the housing 7.

The portable computers 1, 61 and 71 according to the first, second and third embodiments have been described. Embodiments of the present invention is not limited to these embodiments, nevertheless. The push buttons are not limited to touch buttons. They may be, for example, push buttons, for example, power-switch buttons. In embodiments of this invention, the push buttons may be of any type that can be operated when depressed.

The switches 25a and 25b need not be arranged at midpoints between the center A of the button body 31 and the edges of the opening 15. The switches 25a and 25b may be arranged near the center A of the button body 31 or near any edge of the second opening 15. The arm supports may be provided at any positions, not on the housing, if they can hold the buttons 24a and 24b.

Electronic apparatuses to which this invention can be applied are not limited to portable computers. They may be, for example, mobile telephones, digital cameras, video cameras, personal digital assistants, and similar apparatuses.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing which includes an opening;
   a left button which is inserted into the opening;
   a right button which is inserted into the opening;
   a left switch which is arranged in the housing and configured to be operated by the left button; and
   a right switch which is arranged in the housing and configured to be operated by the right button, wherein
   the left button comprises a button body, a first arm which has elasticity, which extends leftward from a left part of the button body of the left button and which is supported by the housing at a left side of the opening, a second arm which has elasticity, which extends forward from a front part of the button body of the left button and which is supported by the housing at a front side of the opening, and a pushing projection which is provided at the button body of the left button to be opposite to the left switch;
   the right button comprises a button body, a first arm which has elasticity, which extends rightward from a right part of the button body of the right button and which is supported by the housing at a right side of the opening, a second arm which has elasticity, which extends forward from a front part of the button body of the right button and which is supported by the housing at a front side of the opening, and a pushing projection which is provided at the button body of the right button to be opposite to the right switch;
   the first arm of the left button supports the button body of the left button from a left side, and the second arm of the left button supports the button body of the left button from a direction orthogonal to a direction in which the first arm of the left button supports the button body of the left button;
   the first arm of the right button supports the button body of the right button from a right side, and the second arm of the right button supports the button body of the right button from a direction orthogonal to a direction in which the first arm of the right button supports the button body of the right button; and
   the left switch and the pushing projection of the left button are provided eccentrically in a direction of being remote from the first and second arms of the left button about a center of the button body of the left button, and the right switch and the pushing projection of the right button are provided eccentrically in a direction of being remote from the first and second arms of the right button about a center of the button body of the right button.

2. The electronic apparatus according to claim 1, wherein the first arm of the left button comprises a first member which is connected with a left-rear part of the button body of the left button and a second member which is connected with a left-front part of the button body of the left button, and the second arm of the left button comprises a third member which is connected with a front-left part of the button body of the left button and a fourth member which is connected with a front-right part of the button body of the left button; and
   the first arm of the right button comprises a first member which is connected with a right-rear part of the button body of the right button and a second member which is connected with a right-front part of the button body of the right button, and the second arm of the right button comprises a third member which is connected with a front-right part of the button body of the right button and a fourth member which is connected with a front-left part of the button body of the right button.

3. An electronic apparatus comprising:
   a housing;
   a first switch situated in the housing and configured to be operated by a first button, the first button comprises (i) a button body, (ii) a first arm within the housing that extends in a first direction from a first part of the button body of the first button, (iii) a second arm within the housing that extends in a second direction from a second part of the button body where the second direction is orthogonal to the first direction, and (iv) a pushing projection that is provided at the button body of the first button to be opposite to the first switch; and
   a second switch situated in the housing and configured to be operated by a second button, the second button comprises (i) a button body, (ii) a third arm that extends in a third direction from a first part of the button body of the second button where the third direction is orthogonal to the second direction, (iii) a fourth arm that extends in the second direction from a second part of the button body of the second button, and (iv) a pushing projection that is provided at the button body of the second button to be opposite to the second switch, wherein
   the first arm. of the first button supports the first button body of the first button from a first direction, and the second arm of the first button supports the button body of the first button from a direction that is orthogonal to a direction in which the first arm of the first button supports the button body of the first button.

4. The electronic apparatus according to claim 3, wherein the third aim of the second button supports the button body of the second button from the third direction, and the fourth arm of the second button supports the button body of the second button from a direction orthogonal to a direction in which the third arm of the second button supports the button body.

5. The electronic apparatus according to claim 3, wherein the third arm of the second button supports the button body of the second button from the third direction that is opposite the first direction, and the fourth arm of the second button supports the button body of the second button from the second direction being orthogonal to the third direction.

6. The electronic apparatus according to claim 3, wherein the first direction is a leftward direction and the third direction is a rightward direction.

7. The electronic apparatus according to claim 3, wherein the first direction is a leftward direction, the second direction is a frontward direction, and the third direction is a rightward direction from an opening within the housing.

8. The electronic apparatus according to claim 3, wherein the first arm of the first button comprises a first member that is coupled to a left-rear part of the button body of the first button and a second member that is coupled to a left-front pan of the button body of the first button.

9. The electronic apparatus according to claim. 7, wherein the third arm of the second button comprises a first member which is coupled to a right-rear part of the button body of the second button and a second member that is coupled to a right-front part of the button body of the second button, and the fourth arm of the second button comprises a third member that is coupled to a front-right part of the button body of the second button and a fourth member that is coupled to a front-left pan of the button body of the second button.

10. An electronic apparatus comprising:
 a housing with an opening;
 a first switch situated in the housing and configured to be operated by a first button, the first button comprises (i) a button body, (ii) a first arm that extends in a first direction from a first part of the button body of the first button and is supported by the housing at a first side of the opening, (iii) a second arm supported by the housing at a second side of the opening and the second arm extending in a second direction from a second part of the button body where the second direction is substantially perpendicular to the first direction, and (iv) a pushing projection that is provided at the button body of the first button to be opposite to the first switch; and
 a second switch situated in the housing and configured to be operated by a second button, the second button comprises (i) a button body, (ii) a third arm that extends in a third direction from a first pan of the button body of the second button where the third direction is opposite the first direction and substantially perpendicular to the second direction and is supported by the housing at a third side of the opening, (iii) a fourth arm supported by the housing at a second side of the opening, the fourth arm extending in the second direction from a second part of the button body of the second button, and (iv) a pushing projection that is provided at the button body of the second button to be opposite to the second switch, wherein
the first arm of the first button supports the first button body of the first button from the first direction, and the second arm of the first button supports the button body of the first button from the second direction.

* * * * *